350-315.
8-14-73    XR    3,752,567    SR

United States Patent [19]
Broadhurst

[11] 3,752,567
[45] Aug. 14, 1973

[54] EYEGLASSES HAVING INTERCHANGEABLE COLORED LENSES

[76] Inventor: Kent Broadhurst, 24 Cornelia St., New York, N.Y. 10014

[22] Filed: July 1, 1971

[21] Appl. No.: 158,817

[52] U.S. Cl.................. 351/47, 350/315, 351/18, 351/19, 315/20, 351/21, 351/22, 351/28, 351/44, 351/57, 351/63
[51] Int. Cl. ....... G02c 9/04, G02c 7/08, G02c 5/08
[58] Field of Search .................. 351/28, 44, 47, 57, 351/63, 18–22; 350/315

[56] References Cited
UNITED STATES PATENTS

| | | | |
|---|---|---|---|
| 2,835,161 | 5/1958 | Williams | 351/20 |
| 2,519,852 | 8/1950 | Ring | 351/63 |
| 1,223,097 | 4/1917 | Nutting | 351/57 |
| 2,938,426 | 5/1960 | Armbruster et al. | 351/29 |
| 2,826,780 | 3/1958 | Dorfman | 351/63 UX |

*Primary Examiner*—David Schonberg
*Assistant Examiner*—Paul A. Sacher
*Attorney*—Allison C. Collard

[57] ABSTRACT

Eyeglass frames having a plurality of circular, multi-colored lenses pivotably mounted thereon so that different colored lenses may be rotatably interchanged in front of the eyes of the wearer of the glasses. The lenses are mounted in a frame which has a small, rounded projection protruding from the edge thereof, adjacent each lens which snaps into a pair of projections provided on the nose bridge of the eyeglass frames in order to lock the lenses into position. The eyeglass frames are pivotably connected above the nose bridge of the eyeglasses in order to allow easy folding of the eyeglasses into a planar configuration.

1 Claim, 4 Drawing Figures

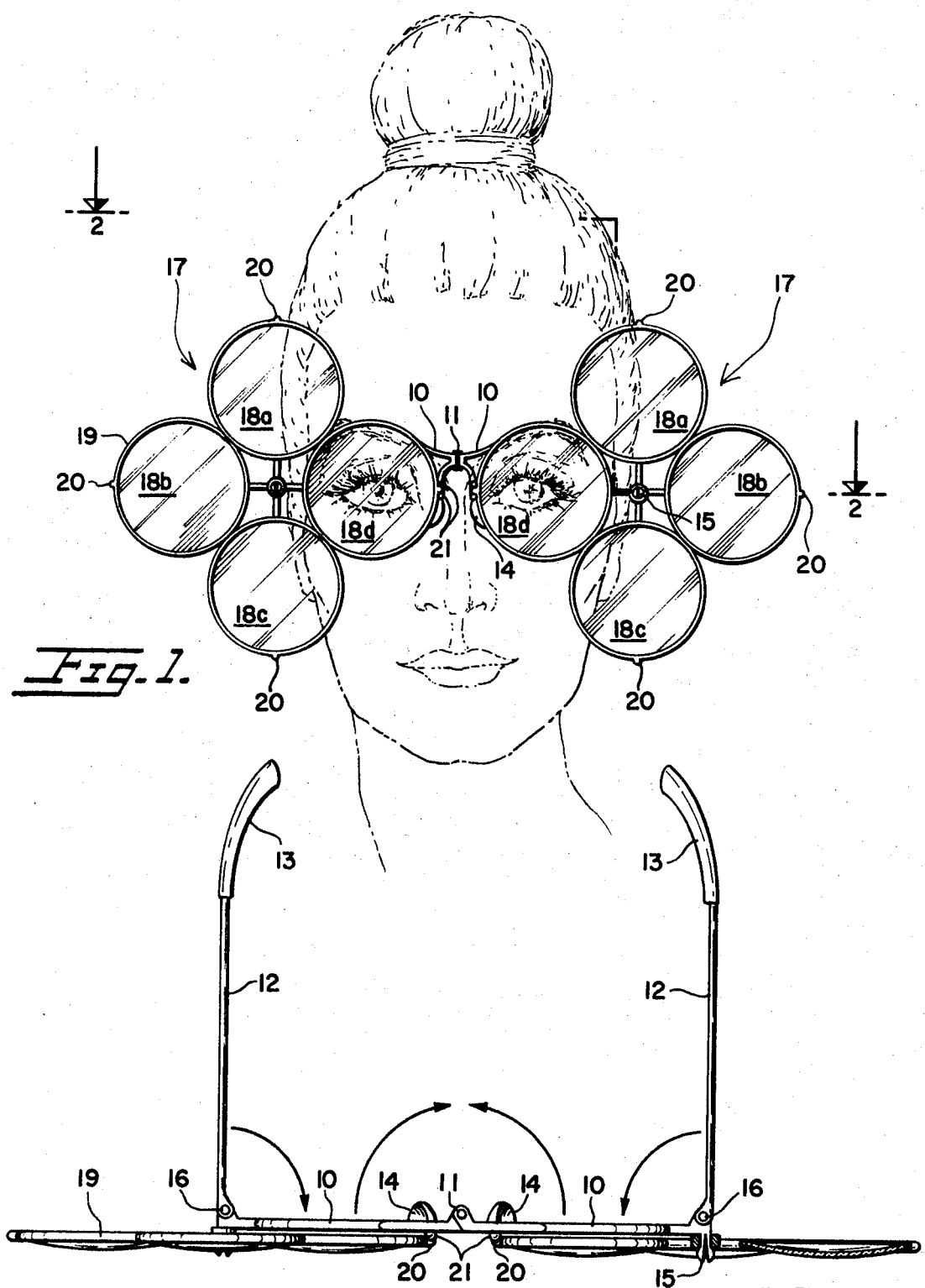

EYEGLASSES HAVING INTERCHANGEABLE COLORED LENSES

The present invention relates to eyeglasses, and in particular, to eyeglass frames having a plurality of pivotably mounted lenses affixed thereto so as to allow the wearer of the glasses to change the lenses he is looking through at will.

During recent years, there has been a noticeable trend towards designing fashionable eyeglasses, both prescription and ordinary eyeglasses and sunglasses, especially for women. Eyeglass manufacturers have thus supplied tinted lenses of numerous different colors, as well as circular, square, and octagonal shaped lens frames, and gold and silver metal frames, instead of the previously used functional plastic. Tinted lenses that are light pink, yellow, brown and blue, have become very popular. However, the buyer of such glasses can only obtain one pair of glasses having tinted lens color he desires. If he gets tired of one color very easily, he must buy another pair of glasses having tinted lenses of a different color, an expensive proposition if his tastes change frequently.

Accordingly, the present invention provides eyeglasses having a plurality of lenses pivotably mounted thereon which may be rotatably interchanged in front of the eyes of the wearer of the eyeglasses as desired. The lenses, for example, could be multi-colored, as well as multifunctional, such as reducing lenses, magnifying lenses, prescription lenses, glare reduction lenses and the like. The eyeglasses are pivotably hinged together at the center of the eyeglass frame above the nose bridge in order to allow folding of th glasses into a form which is convenient for storage when they are not being worn.

It is therefore an object of the present invention to provide eyeglass frames having a plurality of multicolored lenses provided thereon which allow the wearer to change the color of the lenses he is looking through at will.

It is a further object of the present invention to provide a pair of eyeglasses which are simple but fashionable in design, easy to manufacture, and reliable in use.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings, wherein similar reference characters denote similar elements throughout the several views:

FIG. 1 is a front view of a pair of eyeglasses constructed in accordance with the present invention shown in use by the eyeglass wearer;

FIG. 2 is a top partial cross-sectional view of the eyeglasses taken along section 2—2 of FIG. 1;

Figure 3:
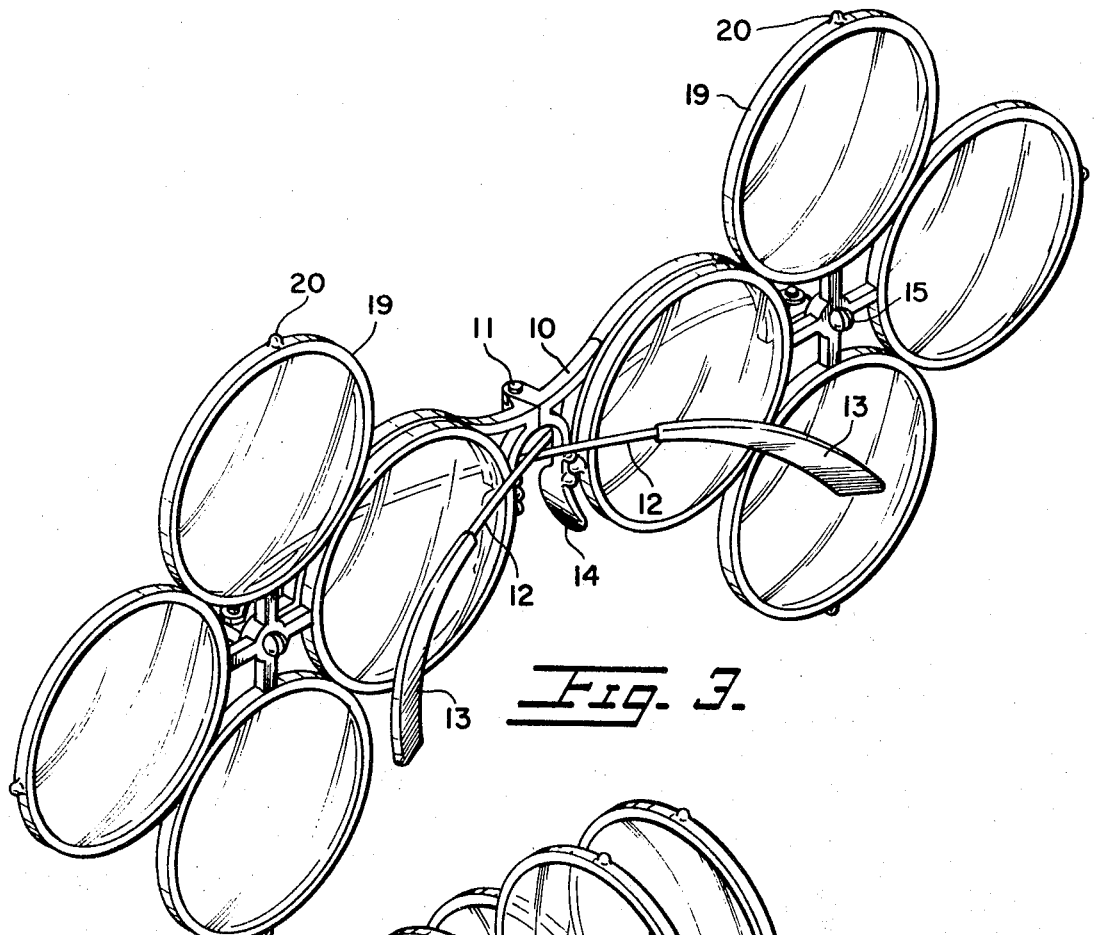
FIG. 3 is a front perspective view of the eyeglasses of the present invention shown with the temple bands thereof disposed between the lenses of the frame adjacent the nose bridge.

Referring to the drawings, a pair of semi-circular eyeglass frames 10 are pivotably coupled together at one end thereof by hinge 11, and have temple bands 12 pivotably secured to the ends thereof by pins 16. Frames 10 and temple bands 12 are constructed of any suitable metallic material. Each temple band has end piece 13 which slips over the end of the temple band in order to prevent irritation while the glasses are worn by the person. The end pieces may be made of soft plastic, or any other type of suitable material having similar characteristics. Eyeglass frames 10 and temple bands 12 are pivotable inwardly as shown by the arrows in FIG. 2. The eye frames are also provided with nose bridge 14 for securing the glasses on the nose of the wearer while they are in use.

Eyeglass frames 10 are provided with mounting extensions 15 protruding perpendicularly from the frames at the end of each eyeglass frame opposite temple band mounting hinge 16. The extensions are substantially cylindrical in shape and have spherical-shaped members affixed to the ends thereof. A longitudinal slit is also provided in the extensions to facilitate mounting of the lenses of the eyeglasses. On each extension is mounted a quadrangular array of eyeglass lenses 18a, 18b, 18c and 18d. Each of the lenses preferably has a different colored tint, although this is merely a matter of choice, and are mounted in pivotable lens frames or supports 17, having four circular-shaped frame members 19, so that the colored lenses may be interchanged in front of the eyes of the wearer of the glasses. The lens frames are mounted by sliding them over the extensions and then expanding the slit spherical portions of the extensions as shown in FIGS. 1 and 2. The frame members are provided with rounded projections or snap couplings 20 which snap between a pair of similar projecting members 21 provided on nose bridge 14 so that the lenses are securely locked in place in front of the eyes of the wearer of the glasses during use. To change lenses, the wearer need only snap projection 20 from the nose bridge and rotate lens frame 17 until the desired lens is in front of his eyes, whereupon he may let the lens frame snap into place between projecting members 21.

It should be noted that although the lenses, and lens frame 19, have been illustrated as being circular in shape, any other type of fashionable design, such as octaganal lenses, square lenses, etc., may be used in place thereof. This is merely a matter of choice of the designer of the particular pair of glasses, and it is even contemplated that different shape lenses may be mounted on the eyeglass frames so that the wearer is provided with four different shaped lenses, as well as four different colored lenses of the same shape.

Frames 19 and 10 are preferably constructed of gold or silver metal, but colored plastic material may also be used. The choice of material is arbitrary.

Figure 4:
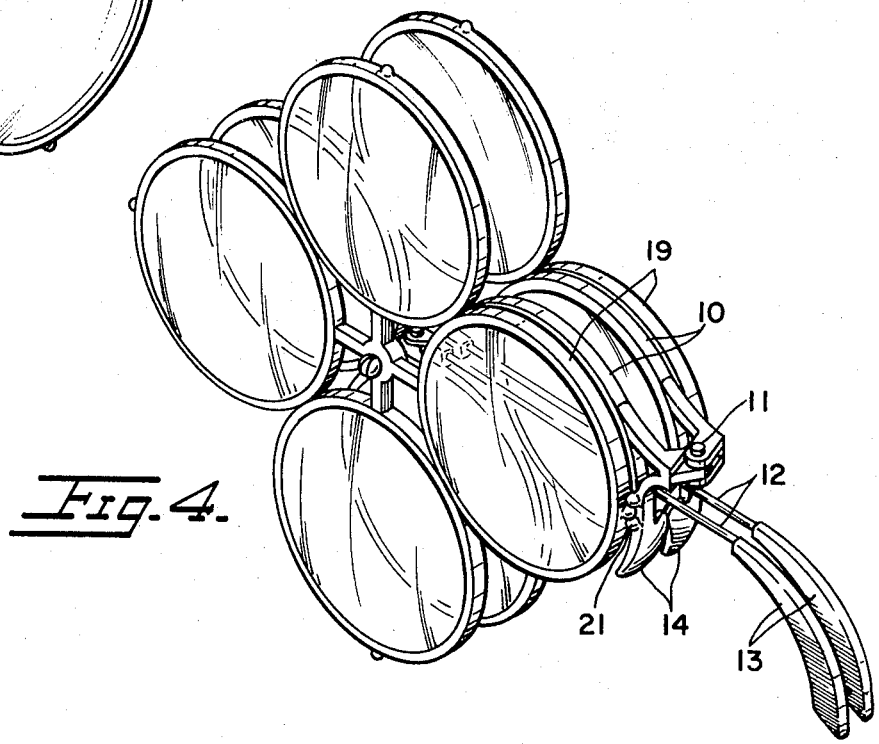
FIG. 4 is a perspective view showing the eyeglasses of FIG. 3 in their folded planar position for storing the glasses when not in use.

As previously stated, frames 10 are pivotably coupled together by hinge 11. Temple bands 12 are constructed so that they are reasonably flexible. This allows the eyeglasses to be folded and stored in the pocket or pocketbook of the wearer when not in use. In order to fold the glasses, flexible temple bands 12 are bent and inserted between nose bridge 14 as shown in FIG. 3. The glasses are then folded rearwardly about hinge 11 unitl they assume the planar configuration illustrated in FIG. 4. The glasses may then be conveniently stored in the pocket or pocketbook of the wearer.

While only a specific embodiment of the present invention has been shown and described, it will be obvious to those skilled in the art that many changes and modifications may be made thereunto without departing from the spirit and scope of the invention.

What is claimed is:

1. An eyeglass having a plurality of colored lenses comprising:

a pair of eyeglass frames pivotably connected about the nose bridge, and having a pair of temple bands pivotably connected at each end on one side of said frames;

a pair of mounting extensions integrally formed and projecting perpendicularly from said frames, said extensions positioned in line with the temple band and on the opposite side of said frames;

a pair of detachable lens supports each rotatably secured on one of said mounting extensions and having integrally formed projections on their periphery and symmetrical about said mounting extensions, said supports including a plurality of apertures radially disposed for receiving the correspondingly colored lenses; and snap couplings disposed on said eyeglass frames adjacent to the nose bridge so as to detachably engage the projections integrally formed on the periphery of each of said supports preventing random movement of the lenses when the desired color is placed in front of the wearer's eye.

* * * * *